(12) United States Patent
Fujiwara et al.

(10) Patent No.: US 12,306,153 B2
(45) Date of Patent: May 20, 2025

(54) ION CHROMATOGRAPH

(71) Applicant: SHIMADZU CORPORATION, Kyoto (JP)

(72) Inventors: Masanori Fujiwara, Kyoto (JP); Katsumasa Sakamoto, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 911 days.

(21) Appl. No.: 17/441,936

(22) PCT Filed: Mar. 27, 2019

(86) PCT No.: PCT/JP2019/013388
§ 371 (c)(1),
(2) Date: Sep. 22, 2021

(87) PCT Pub. No.: WO2020/194608
PCT Pub. Date: Oct. 1, 2020

(65) Prior Publication Data
US 2022/0163495 A1    May 26, 2022

(51) Int. Cl.
*G01N 30/96* (2006.01)
*G01N 27/62* (2021.01)
*G01N 30/02* (2006.01)

(52) U.S. Cl.
CPC .............. *G01N 30/96* (2013.01); *G01N 27/62* (2013.01); *G01N 30/02* (2013.01); *G01N 2030/965* (2013.01)

(58) Field of Classification Search
CPC .......... C02F 1/469; Y02P 10/20; B01D 61/42; B01D 15/08; G01N 30/96; G01N 30/02;
(Continued)

(56) References Cited

U.S. PATENT DOCUMENTS 6,077,434 A * 6/2000 Srinivasan .............. G01N 30/96
                                                                 204/542
6,328,885 B1    12/2001 Srinivasan

FOREIGN PATENT DOCUMENTS

JP         04-301562 A     10/1992
JP       2002-535618 A     10/2002
JP          4750279 B2      8/2011

OTHER PUBLICATIONS

Original and English Translation of Chinese Office Action for corresponding Chinese Application No. 201980094585.9 dated Dec. 1, 2022.

(Continued)

*Primary Examiner* — Akash K Varma
(74) *Attorney, Agent, or Firm* — Renner, Otto, Boisselle & Sklar, LLP

(57) ABSTRACT

In an ion chromatograph, a sample that is included in an eluent and is to be measured is separated into ion species components by a separation column. An electrode liquid to be introduced into an input port is branched by a three-way valve and is discharged from each of a first output port and a second output port. An eluent from the separation column passes through an eluent flow path of an ion suppressor. An electrode liquid from the first and second output ports passes through each of an anode-side flow path and a cathode-side flow path of the ion suppressor. Ion exchange is performed by electrolysis between an eluent that passes through the eluent flow path and an electrode liquid that passes through the anode-side flow path and the cathode-side flow path, and a sample that passes through the eluent flow path and is separated by the separation column is detected by a detector. A backward flow of an electrode liquid in the cathode-side flow path is suppressed by a backward flow suppression mechanism.

7 Claims, 6 Drawing Sheets

(58) Field of Classification Search
CPC ........ G01N 30/88; G01N 30/14; G01N 30/64; G01N 27/62; G01N 27/333; G01N 2030/965; G01N 1/34
USPC ...................................................... 210/198.2
See application file for complete search history.

(56) References Cited

OTHER PUBLICATIONS

Office Action in corresponding Chinese Patent Application No. 201980094585.9 dated Aug. 15, 2023, with English machine translation.
Notice of Reasons for Refusal dated Jul. 5, 2022 for corresponding Japanese Application No. 2021-508555 (English machine translation).
International Search Report for corresponding Application No. PCT/JP2019/013388, mailed Jun. 25, 2019.
Written Opinion for corresponding Application No. PCT/JP2019/013388, mailed Jun. 25, 2019 (English machine translation).

* cited by examiner

ION CHROMATOGRAPH

TECHNICAL FIELD

The present invention relates to an ion chromatograph.

BACKGROUND ART

In an ion chromatograph, a sample to be analyzed is introduced into a separation column together with an eluent. A sample is separated into ion species components by passing through the separation column and introduced into a flow cell of a detector together with the eluent. A chromatogram is generated by sequential detection of electrical conductances of sample components that have been introduced into the flow cell. An ion suppressor may be arranged between the separation column and the detector.

In a suppressor described in Patent Document 1, a sample stream gasket is arranged between a pair of gaskets. A chromatography effluent that has passed through a separation column is introduced into a sample stream screen of the sample stream gasket. A detector effluent that has flowed out from a detector is branched by a three-way valve and is introduced into each of ion exchange screens of the pair of gaskets. Ion exchange is performed by electrodialysis between the detector effluent and the chromatography effluent, so that the electrical conductance of the chromatography effluent is suppressed.

[Patent Document 1] JP 4750279 B2

SUMMARY OF INVENTION

Technical Problem

In a case where dialysis efficiency of an ion suppressor is low, an electrical conductance of an eluent is not so low. Therefore, the background of a chromatogram is increased, so that accuracy of sample analysis is degraded. Thus, it is desired that dialysis efficiency of the ion suppressor is improved.

An object of the present invention is to provide an ion chromatograph having an ion suppressor with improved dialysis efficiency.

Solution to Problem

An aspect according to the present invention relates to an ion chromatograph that includes a separation column that separates a sample that is included in an eluent and is to be measured into ion species components, a three-way valve that has an input port, a first output port and a second output port, and ranches an electrode liquid to be introduced into the input port to discharge the electrode liquid from each of the first output port and the second output port, an ion suppressor that includes an eluent flow path through which an eluent from the separation column passes, an anode-side flow path through which an electrode liquid from the first output port passes and a cathode-side flow path through which an electrode liquid from the second output port passes, and performs ion exchange by electrolysis between an eluent that passes through the eluent flow path and an electrode liquid that passes through the anode-side flow path and the cathode-side flow path, a detector that detects a sample that passes through the eluent flow path and is separated by the separation column, and a backward flow suppression mechanism that suppresses a backward flow of an electrode liquid in the cathode-side flow path.

Advantageous Effects of Invention

With the present invention, dialysis efficiency of an ion suppressor can be improved.

DESCRIPTION OF EMBODIMENTS

(1) Configuration of Ion Chromatograph

Figure 1:
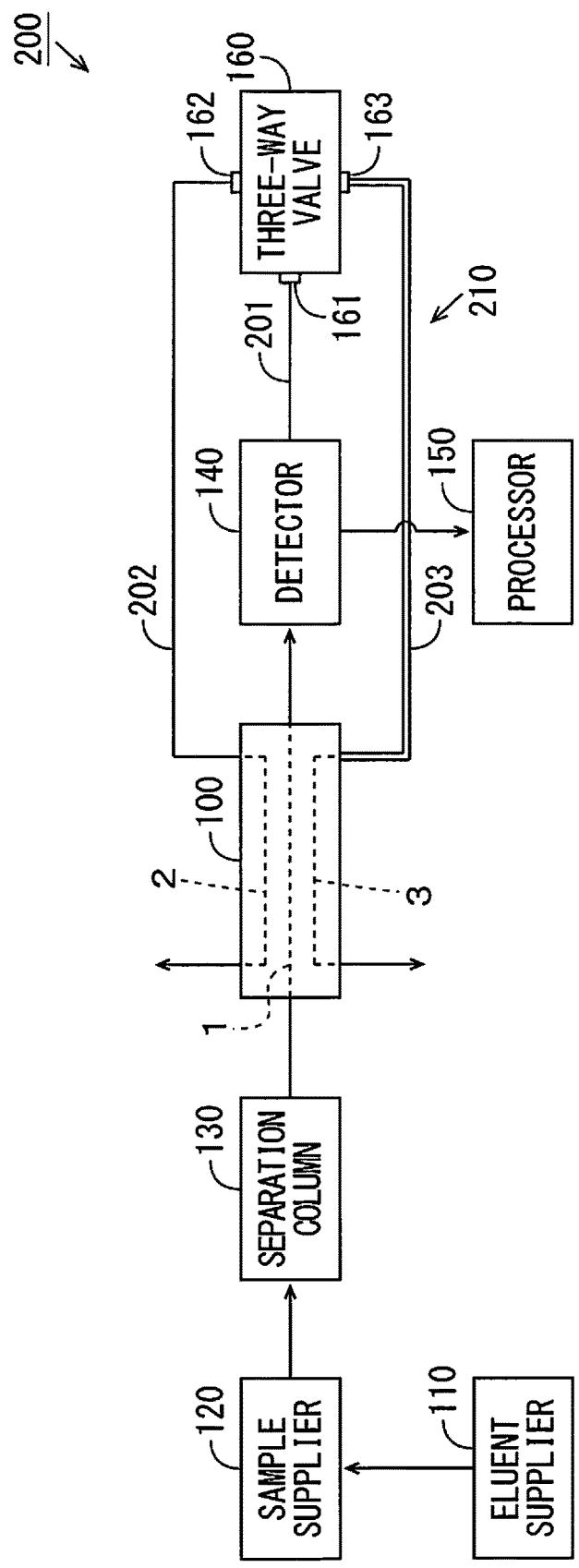
FIG. 1 is a diagram showing the configuration of an ion chromatograph according to one embodiment of the present invention.

An ion chromatograph according to embodiments of the present invention will be described below in detail with reference to the drawings. FIG. 1 is a diagram showing the configuration of the ion chromatograph according to one embodiment of the present invention. As shown in FIG. 1, the ion chromatograph 200 includes an ion suppressor 100, an eluent supplier 110, a sample supplier 120, a separation column 130, a detector 140, a processor 150 and a three-way valve 160.

The eluent supplier 110 includes a chemical liquid bottle, a liquid sending pump and a degassing device, for example, and supplies an eluent such as an aqueous solution as a mobile phase. The sample supplier 120 is an injector, for example, and introduces a sample to be analyzed into the separation column 130 together with an eluent supplied by the eluent supplier 110. The separation column 130 is stored in a column oven (not shown) and adjusted to a predetermined constant temperature. The separation column 130 separates an introduced sample into ion species components.

The detector 140 is an electrical conductance detector and sequentially detects the electrical conductances of a sample and an eluent that have passed through the ion suppressor 100 from the separation column 130. The processor 150 generates a chromatogram representing the relationship between a retention time of each ion species component and an electrical conductance by processing a result of detection by the detector 140.

The three-way valve 160 has an input port 161 and output ports 162, 163. The output ports 162, 163 are examples of first and second output ports, respectively. The input port 161 is connected to the detector 140 by a pipe 201. An eluent that has passed through the detector 140 is introduced into the three-way valve 160 as an electrode liquid from the input port 161 through the pipe 201. The three-way valve 160 branches an electrode liquid that has been introduced from the input port 161 and discharges the electrode liquid from each of the output ports 162, 163.

The ion suppressor 100 has an eluent flow path 1, an anode-side flow path 2 and a cathode-side flow path 3 and is arranged between the separation column 130 and the detector 140. An upstream portion of the anode-side flow path 2 is connected to the output port 162 of the three-way valve 160 by a pipe 202. An upstream portion of the cathode-side flow path 3 is connected to the output port 163 of the three-way valve 160 by a pipe 203. The pipes 202, 203 are examples of first and second pipes, respectively.

A sample and an eluent that have passed through the separation column 130 flow through the eluent flow path 1 and are then guided to the detector 140. An electrode liquid discharged from the output port 162 of the three-way valve 160 is introduced into the upstream portion of the anode-side flow path 2 through the pipe 202, flows through the anode-side flow path 2 and is then discharged from a downstream portion of the anode-side flow path 2. An electrode liquid discharged from the output port 163 of the three-way valve 160 is introduced into an upstream portion of the cathode-side flow path 3 through the pipe 203, flows through the cathode-side flow path 3 and is then discharged from a downstream portion of the cathode-side flow path 3.

In the ion suppressor 100, ion exchange is performed by electrodialysis among an eluent that flows through the eluent flow path 1, an electrode liquid that flows through the anode-side flow path 2 and an electrode liquid that flows through the cathode-side flow path 3, so that an electrical conductance of the eluent that has passed through the eluent flow path 1 is reduced. Details of the ion suppressor 100 will be described below.

In the present embodiment, the pipe 203 has flow path resistance that is smaller than that of the pipe 202. Specifically, the pipe 203 has an inner diameter that is larger than that of the pipe 202. A backward flow suppression mechanism 210 for suppressing a backward flow of an electrode liquid is constituted by the pipes 202, 203. Details of the backward flow suppression mechanism 210 will be described below. While the pipe 202 and the pipe 203 have the same length, the embodiment is not limited to this. The length of the pipe 202 and the length of the pipe 203 may be different from each other. Specifically, the pipe 203 may be shorter than the pipe 202, and the pipe 203 may be slightly longer than the pipe 202.

(2) Configuration of Ion Suppressor

Figure 2:
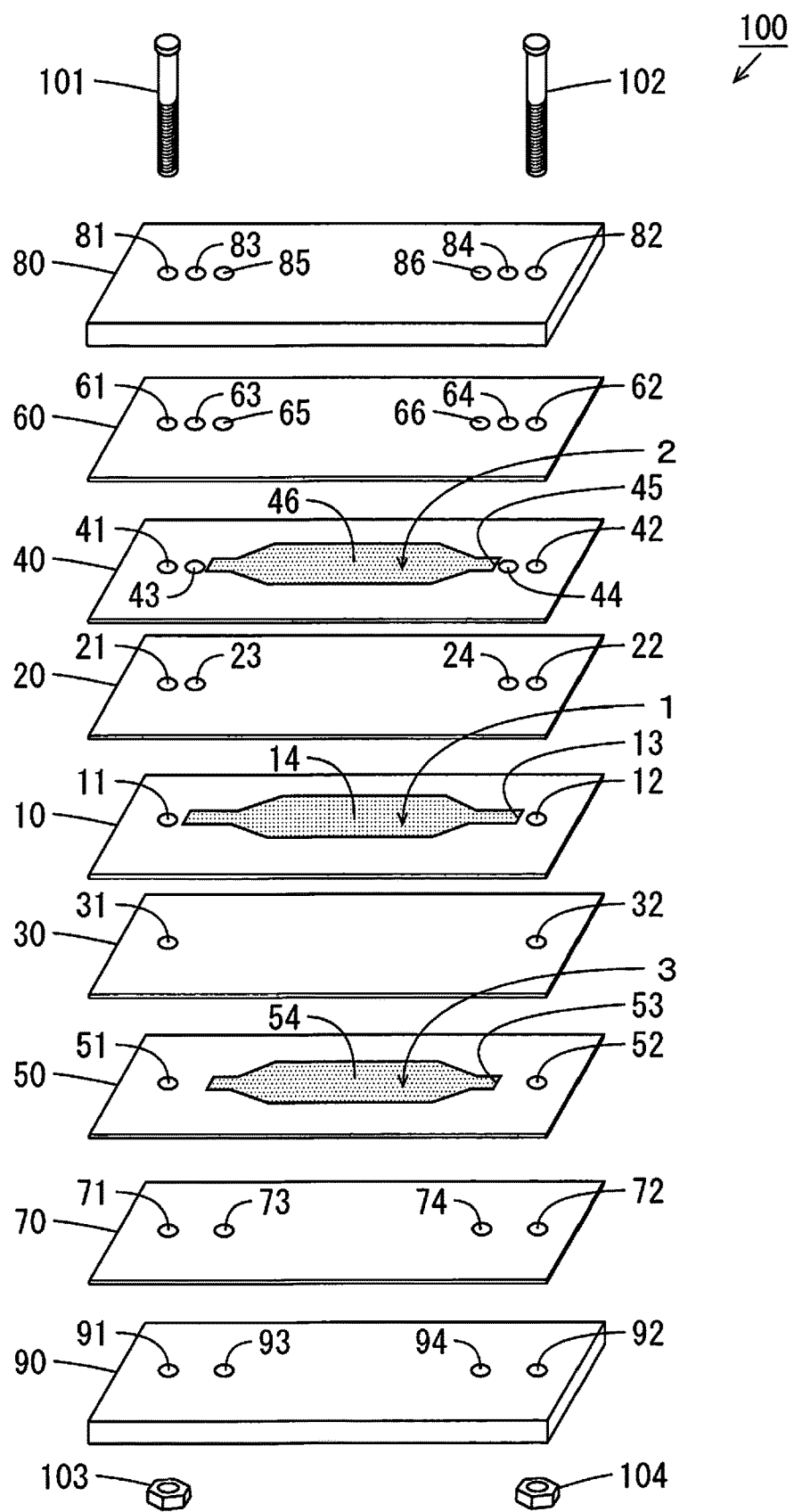
FIG. 2 is an exploded perspective view showing the configuration of an ion suppressor of FIG. 1.

FIG. 2 is an exploded perspective view showing the configuration of the ion suppressor 100 of FIG. 1. As shown in FIG. 2, the ion suppressor 100 includes an eluent seal member 10, a pair of ion exchange membranes 20, 30, a pair of electrode liquid seal members 40, 50, a pair of electrodes 60, 70 and a pair of support members 80, 90. Each of the eluent seal member 10, the ion exchange membranes 20, 30, the electrode liquid seal members 40, 50, the electrodes 60, 70 and the support members 80, 90 has an elongated shape extending in one direction (hereinafter referred to as a flow-path direction).

The eluent seal member 10 has through holes 11, 12 and an opening 13. The through holes 11, 12, are respectively arranged in one end portion and the other end portion in the flow-path direction. The opening 13 is arranged between the through hole 11 and the through hole 12 to extend in the flow-path direction. The space in the opening 13 constitutes the eluent flow path 1. In the present embodiment, a mesh member 14 is provided in the eluent flow path 1.

The ion exchange membranes 20, 30 are cation exchange membranes in a case where ions to be measured are anions, and are anion exchange membranes in a case where ions to be measured are cations. The ion exchange membrane 20 has through holes 21 to 24. The through holes 21, 23 are arranged in one end portion in the flow-path direction in this order from the one end portion to the other end portion. The through holes 22, 24 are arranged in the other end portion in the flow-path direction in this order from the other end portion to the one end portion. The ion exchange membrane 30 has through holes 31, 32. The through holes 31, 32 are respectively arranged in one end portion and the other end portion in the flow-path direction.

The electrode liquid seal member 40 has through holes 41 to 44 and an opening 45. The through holes 41, 43 are arranged in one end portion in the flow-path direction in this order from the one end portion to the other end portion. The through holes 42, 44 are arranged in the other end portion in the flow-path direction in this order from the other end portion to the one end portion. The opening 45 is arranged between the through hole 43 and the through hole 44 to extend in the flow-path direction. The space in the opening 45 constitutes the anode-side flow path 2. In the present embodiment, a mesh member 46 is provided in the anode-side flow path 2.

The electrode liquid seal member 50 has through holes 51, 52 and an opening 53. The through holes 51, 52 are respectively arranged in one end portion and the other end portion in the flow-path direction. The opening 53 is arranged between the through hole 51 and the through hole 52 to extend in the flow-path direction. The space in the opening 53 constitutes the cathode-side flow path 3. In the present embodiment, a mesh member 54 is provided in the cathode-side flow path 3.

The electrode 60 is an anode, for example, and has through holes 61 to 66. The through holes 61, 63, 65 are arranged in one end portion in the flow-path direction in this order from the one end portion to the other end portion. The through holes 62, 64, 66 are arranged in the other end portion in the flow-path direction in this order from the other end portion toward the one end portion.

The electrode 70 is a cathode, for example, and has through holes 71 to 74. The through holes 71, 73 are arranged in one end portion in the flow-path direction in this order from the one end portion toward the other end portion. The through holes 72, 74 are arranged in the other end portion in the flow-path direction in this order from the other end portion toward the one end portion.

The support member 80 is formed of a resin material, for example, and has through holes 81 to 86. The through holes 81, 83, 85 are arranged in one end portion in the flow-path direction in this order from the one end portion toward the other end portion. The through holes 82, 84, 86 are arranged in the other end portion in the flow-path direction in this order from the other end portion toward the one end portion. The support member 90 is formed of a material similar to that of the support member 80 and has through holes 91 to 94. The through holes 91, 93 are arranged in one end portion in the flow-path direction in this order from the one end portion toward the other end portion. The through holes 92, 94 are arranged in the other end portion in the flow-path direction in this order from the other end portion toward the one end portion.

The support member 80, the electrode 60, the electrode liquid seal member 40, the ion exchange membrane 20, the eluent seal member 10, the ion exchange membrane 30, the electrode liquid seal member 50, the electrode 70 and the support member 90 are stacked in this order from above toward below in an up-and-down direction. In this case, in one end portion of the ion suppressor 100, the through holes 81, 61, 41, 21, 11, 31, 51, 71, 91 overlap with one another.

In the other end portion of the ion suppressor 100, the through holes 82, 62, 42, 22, 12, 32, 52, 72, 92 overlap with one another.

Further, the eluent flow path 1 and the anode-side flow path 2 are opposite to each other with the ion exchange membrane 20 sandwiched therebetween, and the eluent flow path 1 and the cathode-side flow path 3 are opposite to each other with the ion exchange membrane 30 sandwiched therebetween. The through holes 83, 63, 43, 23 overlap with the one end portion of the eluent flow path 1, and the through holes 84, 64, 44, 24 overlap with the other end portion of the eluent flow path 1. The through holes 85, 65 overlap with the one end portion of the anode-side flow path 2, and the through holes 86, 66 overlap with the other end portion of the anode-side flow path 2. The through holes 93, 73 overlap with the one end portion of the cathode-side flow path 3, and the through holes 94, 74 overlap with the other end portion of the cathode-side flow path 3.

Here, a screw member 101 is inserted into the through holes 81, 61, 41, 21, 11, 31, 51, 71, 91 from above toward below, and a screw member 102 is inserted into the through holes 82, 62, 42, 22, 12, 32, 52, 72, 92 from above toward below. Nuts 103, 104 are respectively attached to the lower end portions of the screw members 101, 102. Thus, with the eluent seal member 10, the ion exchange membranes 20, 30, the electrode liquid seal members 40, 50 and the electrodes 60, 70 integrally supported by the support members 80, 90, the ion suppressor 100 is assembled.

(3) Operation of Ion Suppressor

Figure 3:
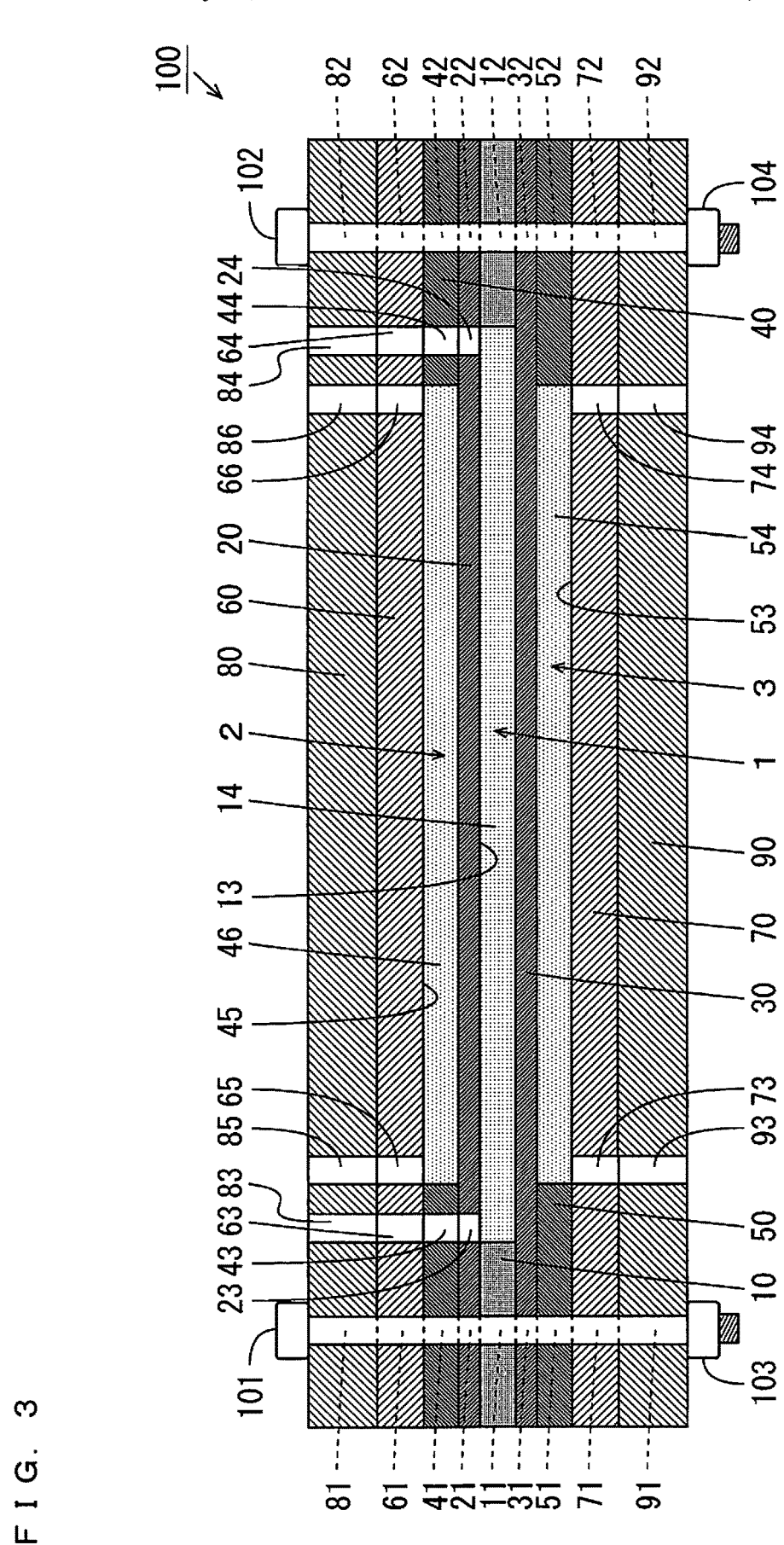
FIG. 3 is a diagram for explaining the operation of the ion suppressor of FIG. 2.

FIG. 3 is a diagram for explaining the operation of the ion suppressor 100 of FIG. 2. An eluent that includes a sample and has passed through the separation column 130 of FIG. 1 is guided to the eluent flow path 1 through the through holes 83, 63, 43, 23 from the one end portion of the ion suppressor 100 of FIG. 3 and then flows through the eluent flow path 1 toward the other end portion. Thereafter, the eluent is guided to the detector 140 of FIG. 1 through the through holes 24, 44, 64, 84 from the other end portion of the ion suppressor 100. As described above, in the detector 140, the electrical conductances of the sample and the eluent are sequentially detected.

The eluent that has passed through the detector 140 is introduced into the three-way valve 160 (FIG. 1) from the input port 161 (FIG. 1) through the pipe 201 (FIG. 1) as an electrode liquid. Part of the electrode liquid that has been introduced into the three-way valve 160 is guided to the anode-side flow path 2 from the through holes 86, 66 in the other end portion of the ion suppressor 100 through the pipe 202 (FIG. 1). The electrode liquid flows through the anode-side flow path 2 toward the one end portion of the ion suppressor 100 and is then discharged to outside through the through holes 65, 85 in the one end portion of the ion suppressor 100.

The other part of the electrode liquid that has been introduced into the three-way valve 160 is guided to the cathode-side flow path 3 from the through holes 94, 74 in the other end portion of the ion suppressor 100 through the pipe 203 (FIG. 1). The electrode liquid flows through the cathode-side flow path 3 toward the one end portion of the ion suppressor 100 and is then discharged to outside through the through holes 73, 93 in the one end portion of the ion suppressor 100.

A positive voltage is applied to the electrode 60, and a negative voltage is applied to the electrode 70. In this case, hydrogen ions and oxygen molecules are generated in the anode-side flow path 2 by electrolysis of water, and hydroxide ions and hydrogen molecules are generated in the cathode-side flow path 3. The hydrogen ions generated in the anode-side flow path 2 are transmitted through the ion exchange membrane 20 to move to the eluent flow path 1, and are replaced with cations such as sodium ions or potassium ions in an eluent in the eluent flow path 1. The cations with which the hydrogen ions have been replaced are transmitted through the ion exchange membrane 30 to move to the cathode-side flow path 3, are combined with hydroxide ions in the cathode-side flow path 3 and then are discharged together with an electrode liquid.

Here, an amount of hydrogen molecules to be generated in the cathode-side flow path 3 is twice as much as an amount of oxygen molecules to be generated in the anode-side flow path 2. That is, a larger amount of gas (bubbles) is generated in the cathode-side flow path 3 than in the anode-side flow path 2. The inventors of the present invention carried out various experiments and studies, and obtained the finding that dialysis efficiency may be degraded when such a large amount of bubbles causes an electrode liquid to flow backward in the cathode-side flow path 3.

As such, in the present embodiment, the inner diameter of the pipe 203 connected to the cathode-side flow path 3 is larger than the inner diameter of the pipe 202 connected to the anode-side flow path 2. In this case, with electrodialysis not being performed, the flow rate of an electrode liquid to be supplied to the pipe 203 is larger than the flow rate of an electrode liquid to be supplied to the pipe 202. With electrodialysis being performed, the flow rate of an electrode liquid to be supplied to the pipe 203 is larger than the flow rate of an electrode liquid to be supplied to the pipe 202, and the liquid sending resistance of the pipe 202 is large because the inner diameter of the pipe 202 is small. Therefore, even in a case where a large amount of bubbles is generated in the cathode-side flow path 3, a backward flow of bubbles and the electrode liquid can be suppressed, and the bubbles and the electrode liquid can be pushed to flow in a normal flow direction. As a result, the flow rate of the electrode liquid to be supplied to the pipe 203 and the flow rate of the electrode liquid to be supplied to the pipe 202 are close to be equal to each other. In this manner, the backward flow suppression mechanism 210 is constituted by the pipe 202 and the pipe 203 having the inner diameter larger than that of the pipe 202.

The inner diameter of the pipe 203 is not less than 1.2 times and not more than 6 times as large as the inner diameter of the pipe 202, for example. In the present embodiment, when the total flow rate from the three-way valve 160 is about 1 mL/minute, the inner diameter (diameter) of the pipe 202 is set to 0.2 mm to 0.5 mm, for example, and the inner diameter (diameter) of the pipe 203 is set to 0.8 mm to 1.2 mm, for example. However, the embodiment is not limited to this. With electrodialysis not being performed, the inner diameters of the pipes 202, 203 may be set such that the ratio of the flow rate of an electrode liquid to be supplied to the pipe 202 with respect to the flow rate of an electrode liquid to be supplied to the pipe 203 is a predetermined value (7:3, for example).

With the above-mentioned configuration, even in a case where a large amount of bubbles is generated in the cathode-side flow path 3, a backward flow of an electrode liquid is suppressed, and the electrode liquid appropriately moves through the cathode-side flow path 3. However, ion exchange is performed between an eluent that moves through the eluent flow path 1 and an electrode liquid that moves through the anode-side flow path 2 and the cathode-side flow path 3, whereby an electrical conductance of the eluent that has passed through the eluent flow path 1 is reduced. Thus, the background of a chromatogram generated by the processor 150 of FIG. 1 is reduced. As a result, accuracy of a sample analysis can be improved.

(4) Effects

In the ion chromatograph 200 according to the present embodiment, a sample that is to be measured and is included in an eluent is separated into ion species components by the separation column 130. An electrode liquid that is introduced into the input port 161 is branched by the three-way valve 160 and is discharged from each of the output ports 162, 163. An eluent from the separation column 130 passes through the eluent flow path 1 of the ion suppressor 100. An electrode liquid from the output ports 162, 163 passes through each of the anode-side flow path 2 and the cathode-side flow path 3 of the ion suppressor 100. Ion exchange is performed by electrolysis between an eluent that passes through the eluent flow path 1 and an electrode liquid that passes through the anode-side flow path 2 and the cathode-side flow path 3, and a sample that passes through the eluent flow path 1 and is separated by the separation column 130 is detected by the detector 140. A backward flow of an electrode liquid in the cathode-side flow path 3 is suppressed by the backward flow suppression mechanism 210.

With the above-mentioned configuration, even in a case where a large amount of bubbles is generated in the cathode-side flow path 3, a backward flow of an electrode liquid is suppressed, and an electrode liquid appropriately moves through the cathode-side flow path 3. In this case, ion exchange is performed efficiently between an eluent that moves through the eluent flow path 1 and an electrode liquid that moves through the anode-side flow path 2 and the cathode-side flow path 3. Thus, dialysis efficiency of the ion suppressor 100 can be improved.

(5) Modified Examples

Figure 4:
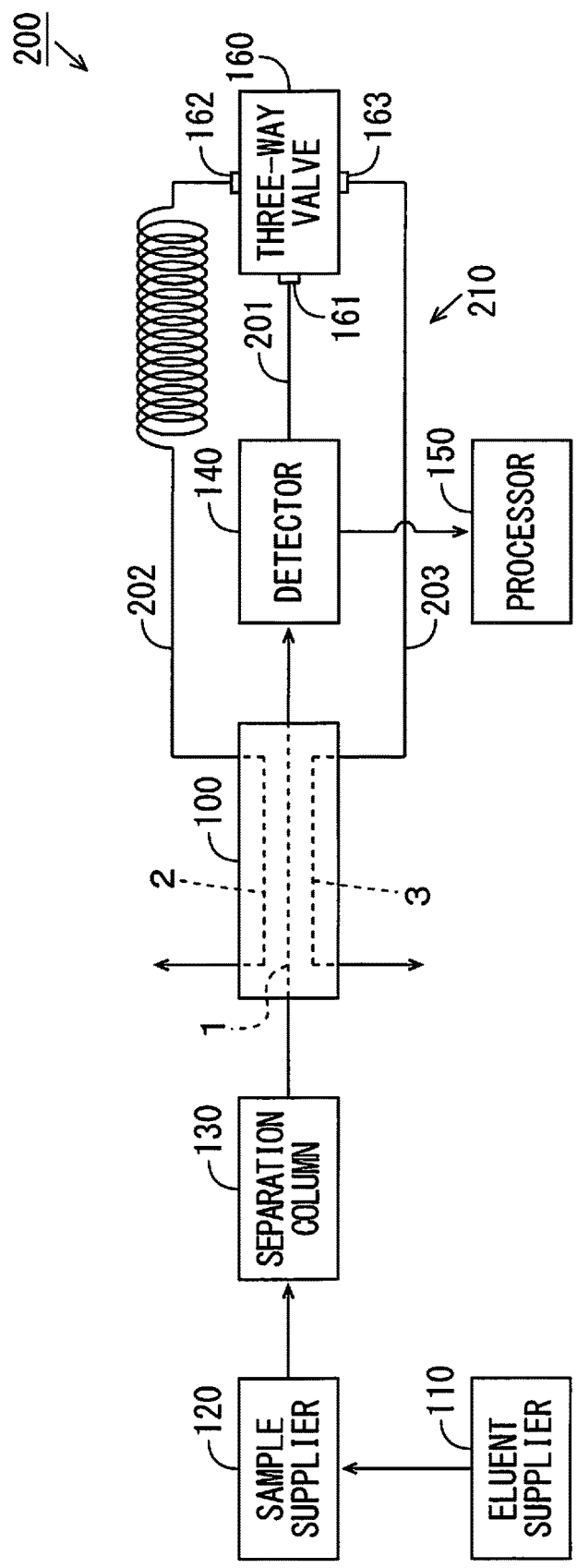
FIG. 4 is a diagram showing the configuration of an ion chromatograph according to a first modified example.

While the inner diameter of the pipe 203 is set larger than the inner diameter of the pipe 202 in the present embodiment, the embodiment is not limited to this. FIG. 4 is a diagram showing the configuration of an ion chromatograph 200 according to a first modified example. As shown in FIG. 4, in the first modified example, a pipe 203 and a pipe 202 that is longer than the pipe 203 are provided as a backward flow suppression mechanism 210. The length of the pipe 202 is not less than twice but not more than 1000 times as large as the pipe 203, for example. Further, the inner diameter of the pipe 203 may be as large as the inner diameter of the pipe 202.

In the first modified example, the flow path resistance of the pipe 203 is smaller than the flow path resistance of the pipe 202. In this case, with electrodialysis not being performed, the flow rate of an electrode liquid to be supplied to the pipe 203 is larger than the flow rate of an electrode liquid to be supplied to the pipe 202. With electrodialosis being performed, because the flow rate of an electrode liquid to be supplied to the pipe 203 is larger than the flow rate of an electrode liquid to be supplied to the pipe 202, even when a large amount of bubbles is generated in the cathode-side flow path 3, a backward flow of bubbles and an electrode liquid can be suppressed, and the bubbles and the electrode liquid can be pushed to flow in a normal flow direction. As a result, the flow rate of the electrode liquid to be supplied to the pipe 203 and the flow rate of the electrode liquid to be supplied to the pipe 202 are close to being equal to each other. In this manner, even in a case where a large amount of bubbles is generated in the cathode-side flow path 3, a backward flow of an electrode liquid is suppressed, and an electrode liquid appropriately moves through the cathode-side flow path 3.

Figure 5:
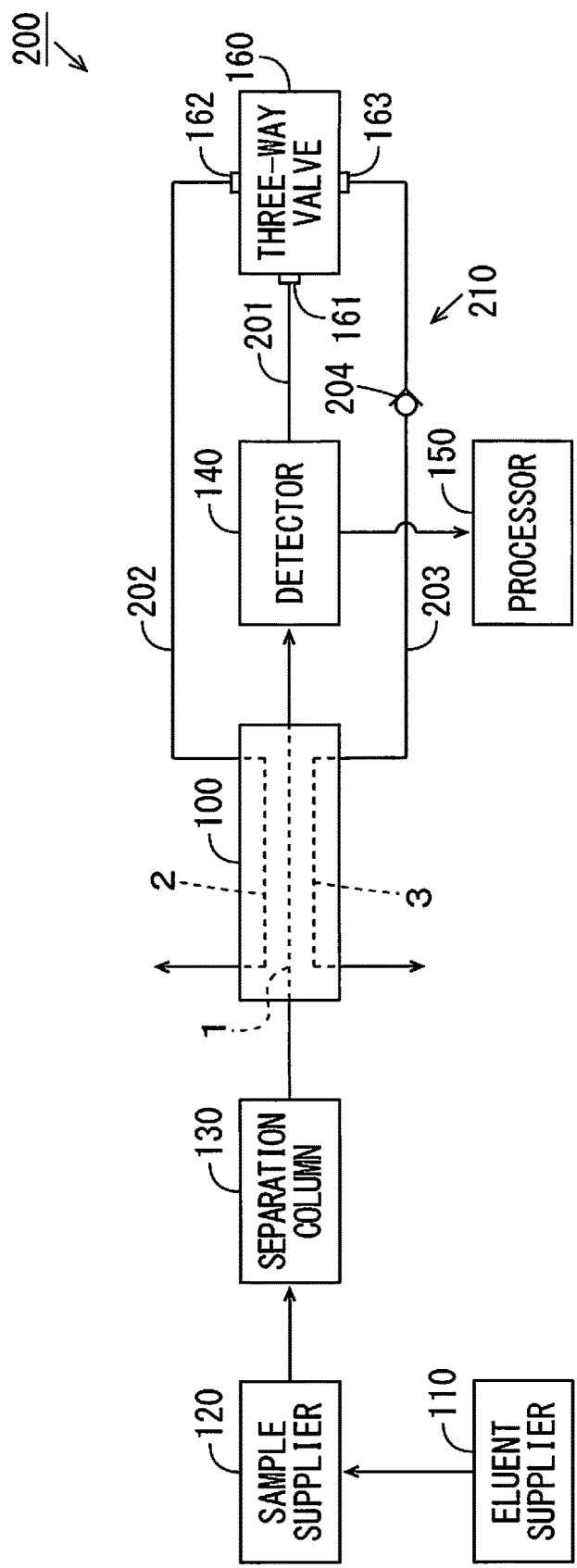
FIG. 5 is a diagram showing the configuration of an ion chromatograph according to a second modified example.

FIG. 5 is a diagram showing the configuration of an ion chromatograph 200 according to a second modified example. As shown in FIG. 5, in the second modified example, a pipe 203 and a check valve 204 provided in the pipe 203 are provided as a backward flow suppression mechanism 210. In this case, the pipe 203 is an example of a pipe. The inner diameter of the pipe 203 may be as large as the inner diameter of a pipe 202. Further, the length of the pipe 203 may be as large as the length of the pipe 202.

In the second modified example, a backward flow of an electrode liquid in the pipe 203 is prevented by the check valve 204. Therefore, even in a case where a large amount of bubbles is generated in a cathode-side flow path 3, an electrode liquid moves appropriately through the cathode-side flow path 3. Therefore, ion exchange is performed more efficiently between an eluent that moves through the eluent flow path 1 and an electrode liquid that moves through an anode-side flow path 2 and the cathode-side flow path 3. Thus, dialysis efficiency of an ion suppressor can be more sufficiently improved.

(6) Other Embodiments (a) While the mesh member 14 is provided in the eluent flow path 1 in the above-mentioned embodiment, the embodiment is not limited to this. The mesh member 14 does not have to be provided in the eluent flow path 1. Similarly, while the mesh members 46, 54 are respectively provided in the anode-side flow path 2 and the cathode-side flow path 3 in the above-mentioned embodiment, the embodiment is not limited to this. The mesh member 46 does not have to be provided in the anode-side flow path 2, and the mesh member 54 does not have to be provided in the cathode-side flow path 3.

(b) While the through holes 24, 44, 64, 84 for introduction of an eluent into the eluent flow path 1 are respectively formed in the ion exchange membrane 20, the electrode liquid seal member 40, the electrode 60 and the support member 80 in the above-mentioned embodiment, the embodiment is not limited to this. A plurality of through holes for introduction of an eluent into the eluent flow path 1 may be respectively formed in the ion exchange membrane 30, the electrode liquid seal member 50, the electrode 70 and the support member 90.

Similarly, while the through holes 23, 43, 63, 83 for discharge of an eluent from the eluent flow path 1 are respectively formed in the ion exchange membrane 20, the electrode liquid seal member 40, the electrode 60 and the support member 80 in the above-mentioned embodiment, the embodiment is not limited to this. A plurality of through holes for discharge of an eluent from the eluent flow path 1 may be respectively formed in the ion exchange membrane 30, the electrode liquid seal member 50, the electrode 70 and the support member 90.

(c) While an eluent to be discharged from the detector 140 is supplied to the anode-side flow path 2 and the cathode-side flow path 3 as an electrode liquid in the above-mentioned embodiment, the embodiment is not limited to this. As long as the three-way valve 160 is used, an eluent that is prepared separately may be supplied to the anode-side flow path 2 and the cathode-side flow path 3 as an electrode liquid.

(d) While the one end portion and the other end portion of the ion suppressor 100 are fixed by the two screw members 101, 102 in the above-mentioned embodiment, the embodiment is not limited to this. Portions in the vicinity of the four corners of the ion suppressor 100 may be fixed by four screw members, for example. Further, in a case where the through holes 91, 92 of the support member 90 are screw holes, the nuts 103, 104 do not have to be attached to the screw members 101, 102.

(7) Inventive Example and Comparative Example

In each of an inventive example and a comparative example, a chromatogram of an eluent was measured with the use of an ion chromatograph. In the ion chromatograph according to the inventive example, the ion chromatograph 200 of FIG. 1 was used. The ion chromatograph according to the comparative example is similar to the ion chromatograph according to the inventive example except for not having a backward flow suppression mechanism.

Figure 6:
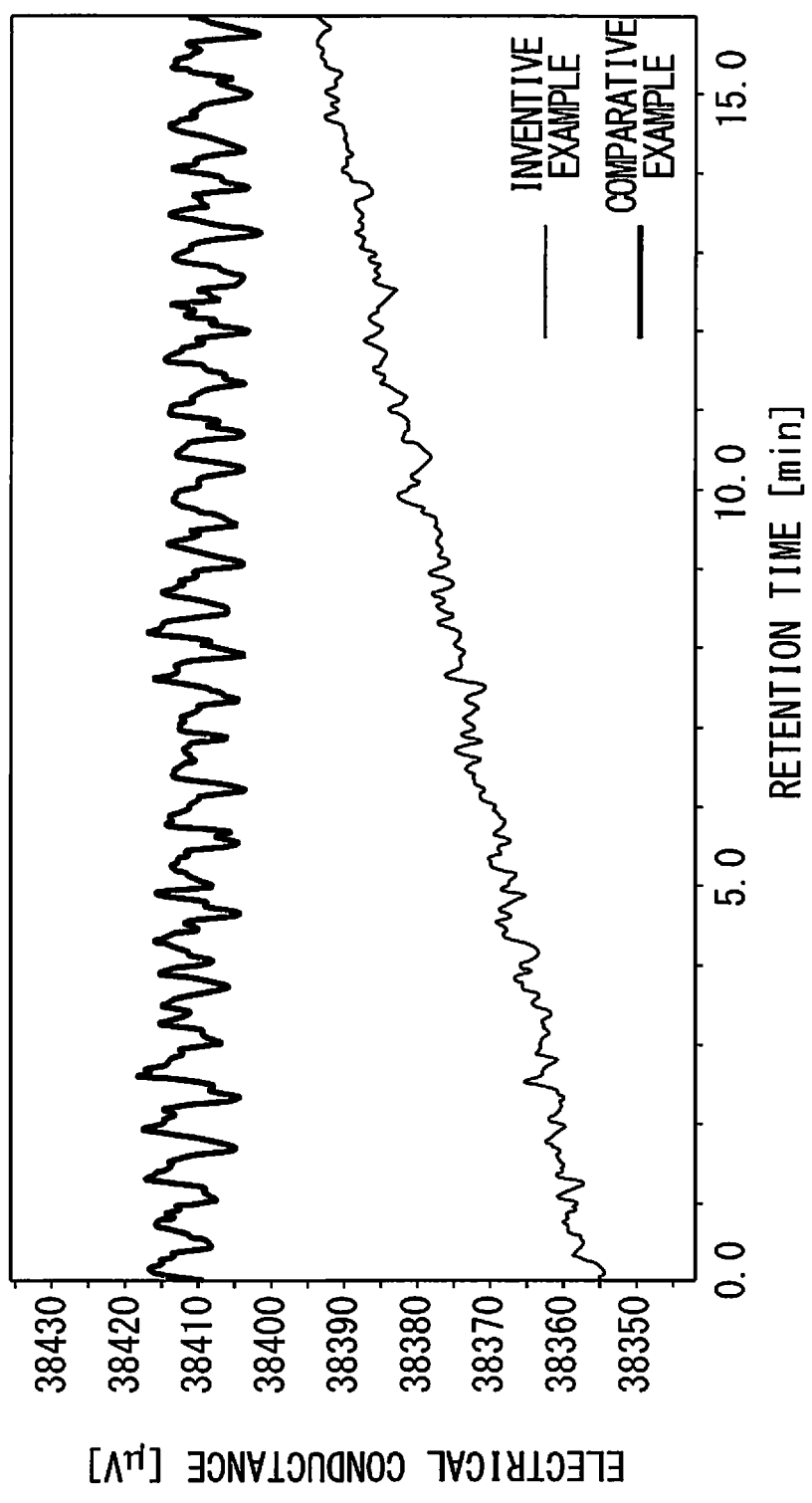
FIG. 6 is a diagram showing chromatograms in an inventive example and a comparative example.

FIG. 6 is a diagram showing the chromatograms in the inventive example and the comparative example. The abscissa of FIG. 6 indicates a retention time of a sample, and the ordinate indicates an electrical conductance of sample converted into a voltage value. While the background fluctuates in a short term in the comparative example as indicated by the thick line in FIG. 6, the background is stable in the inventive example. Specifically, the fluctuation amount of the background in the inventive example is about ½ as much as the fluctuation amount of the background in the comparative example. As a result, in the inventive example, it was confirmed that dialysis efficiency is improved, and a sample can be analyzed with high accuracy.

(8) Aspects

The inventors of the present invention carried out various experiments and studies repeatedly in order to specify the cause of non-improvement of dialysis efficiency in a suppressor of Patent Document 1 and obtained the following findings as a result. In a sample stream gasket of the suppressor of Patent Document 1, a detector effluent that has flowed out from a detector is branched by a three-way valve and is introduced into each of ion exchange screens of a pair of gaskets. Due to electrolysis of a detector effluent, oxygen molecules are generated in one ion exchange screen, and hydrogen molecules are generated in the other ion exchange screen.

Here, an amount of hydrogen molecules to be generated in the ion exchange screen on the cathode side is twice as much as an amount of oxygen molecules to be generated in the ion exchange screen on the anode side. That is, a larger amount of gas (bubbles) is generated in the ion exchange screen on the cathode side than in the ion exchange screen on the anode side. Such a large amount of bubbles may cause an electrode liquid to flow backward in the ion exchange screen on the cathode side. In this case, dialysis efficiency is degraded. The inventors of the present invention hit upon the below-mentioned configuration based on the findings.

(Item 1) An ion chromatograph according to one aspect may include a separation column that separates a sample that is included in an eluent and is to be measured into ion species components, a three-way valve that has an input port, a first output port and a second output port, and branches an electrode liquid to be introduced into the input port to discharge the electrode liquid from each of the first output port and the second output port, an ion suppressor that includes an eluent flow path through which an eluent from the separation column passes, an anode-side flow path through which an electrode liquid from the first output port passes and a cathode-side flow path through which an electrode liquid from the second output port passes, and performs ion exchange by electrolysis between an eluent that passes through the eluent flow path and an electrode liquid that passes through the anode-side flow path and the cathode-side flow path, a detector that detects a sample that passes through the eluent flow path and is separated by the separation column, and a backward flow suppression mechanism that suppresses a backward flow of an electrode liquid in the cathode-side flow path.

In the ion chromatograph, the sample that is included in the eluent and is to be measured is separated into ion species components by the separation column. The electrode liquid to be introduced into the input port is branched by the three-way valve and is discharged from each of the first output port and the second output port. The eluent from the separation column passes through the eluent flow path of the ion suppressor. The electrode liquid from the first and second output ports passes through each of the anode-side flow path and the cathode-side flow path of the ion suppressor. Ion exchange is performed electrolysis between the eluent that passes through the eluent flow path and the electrode liquid that passes through the anode-side flow path and the cathode-side flow path, whereby a sample that passes through the eluent flow path and is separated by the separation column is detected by the detector. A backward flow of the electrode liquid in the cathode-side flow path is suppressed by the backward flow suppression mechanism.

With the above-mentioned configuration, even in a case where a large amount of bubbles is generated in the cathode-side flow path, a backward flow of the electrode liquid is suppressed, and the electrode liquid moves through the cathode-side flow path appropriately. In this case, ion exchange is performed efficiently between the eluent that flows through the eluent flow path and the electrode liquid that moves through the anode-side flow path and the cathode-side flow path. Thus, dialysis efficiency of the ion suppressor can be improved.

(Item 2) In the ion chromatograph according to item 1, the backward flow suppression mechanism may include a first pipe that connects the first output port to an upstream portion of the anode-side flow path, and a second pipe that connects the second output port to an upstream portion of the cathode-side flow path, and flow path resistance of the second pipe may be smaller than flow path resistance of the first pipe.

In this case, a backward flow of the electrode liquid in the cathode-side flow path can be suppressed with a simple configuration.

(Item 3) In the ion chromatograph according to item 2, an inner diameter of the second pipe may be larger than an inner diameter of the first pipe.

In this case, the flow path resistance of the second pipe can be reduced to be smaller than the flow path resistance of the first pipe easily and with a simple configuration.

(Item 4) In the ion chromatograph according to item 3, the inner diameter of the second pipe may be not less than 1.2 times and not more than 6 times as large as the inner diameter of the first pipe.

In this case, the flow rate of the electrode liquid to be supplied to the first pipe and the flow rate of the electrode liquid to be supplied to the second pipe are close to being equal to each other. Therefore, ion exchange is performed more efficiently between the eluent that moves through the eluent flow path and the electrode liquid that moves through the anode-side flow path and the cathode-side flow path. Thus, dialysis efficiency of the ion suppressor can be more sufficiently improved.

(Item 5) In the ion chromatograph according to any one of items 2 to 4, the first pipe may be longer than the second pipe.

Even in this case, the flow path resistance of the second pipe can be easily reduced to be smaller than the flow path resistance of the first pipe.

(Item 6) In the ion chromatograph according to item 5, a length of the first pipe may be not less than twice and not more than 1000 times as large as a length of the second pipe.

In this case, the flow rate of the electrode liquid to be supplied to the first pipe and the flow rate of the electrode liquid to be supplied to the second pipe are close to being equal to each other. Therefore, ion exchange is performed more efficiently between the eluent that moves through the eluent flow path and the electrode liquid that moves through the anode-side flow path and the cathode-side flow path. Thus, dialysis efficiency of the ion suppressor can be more sufficiently improved.

(Item 7) In the ion chromatograph according to item 1, the backward flow suppression mechanism may include a pipe that connects the second output port to an upstream portion of the cathode-side flow path, and a check valve provided in the pipe.

In this case, a backward flow of the electrode liquid in the cathode-side flow path can be prevented. Therefore, ion exchange is performed more efficiently between the eluent that moves through the eluent flow path and the electrode liquid that moves through the anode-side flow path and the cathode-side flow path. Thus, dialysis efficiency of the ion suppressor can be more sufficiently improved.

The invention claimed is:

1. An ion chromatograph comprising:
a separation column that separates a sample that is included in an eluent. wherein the sample to be measured into ion species components;
a three-way valve that has an input port, a first output port and a second output port, wherein in the three-way valve branches an electrode liquid to be introduced into the input port to discharge a first output port electrode liquid, and a second output port electrode liquid from the respective of the first output port and the second output port;
an ion suppressor that includes an eluent flow path through which the eluent from the separation column passes, an anode-side flow path through which the first output port electrode liquid from the first output port passes and a cathode-side flow path through which the second output port electrode liquid from the second output port passes;
wherein the ion suppressor performs ion exchange by electrolysis between an-the eluent that passes through the eluent flow path, the first output port electrode liquid that passes through the anode-side flow path, and the second output port electrode liquid that passes through the cathode-side flow path;
a detector that detects the sample that passes through the eluent flow path and is separated by the separation column; and
a backward flow of the second output port electrode liquid in the cathode-side flow path, wherein:
the backward flow suppression mechanism includes:
a first pipe that has a flow path resistance and that connects the first output port to an upstream portion of the anode-side flow path, and
the flow path resistance of the second pipe is smaller than the flow path resistance of the first pipe to prevent the backward flow to the three-way valve of the second output port electrode liquid from the cathode-side flow path.

2. The ion chromatograph according to claim 1, wherein an inner diameter of the second pipe is larger than an inner diameter of the first pipe.

3. The ion chromatograph according to claim 2, wherein the inner diameter of the second pipe is not less than 1.2 times and not more than 6 times as large as the inner diameter of the first pipe.

4. The ion chromatograph according to claim 1, wherein the first pipe is longer than the second pipe.

5. The ion chromatograph according to claim 4, wherein a length of the first pipe is not less than twice and not more than 1000 times as large as a length of the second pipe.

6. The ion chromatograph according to claim 1, wherein the backward flow suppression mechanism includes:
a check valve provided in the second pipe.

7. The ion chromatograph according to claim 1, wherein an amount of bubbles generated in the cathode-side flow path is larger than an amount of bubbles generated in the anode-side flow path, and
the flow path resistance of the second pipe being smaller than the flow path resistance of the first pipe suppresses a backward flow of bubbles and the second output port electrode liquid in the cathode-side flow path, and causes a flow rate of the second output port electrode liquid to be supplied to the second pipe and a flow rate of the first output port electrode liquid to be supplied to the first pipe to be closer to being equal to each other as compared to a case where the flow path resistance of the second pipe is equal to the flow path resistance of the first pipe.

* * * * *